(12) United States Patent
Knox et al.

(10) Patent No.: US 8,799,339 B1
(45) Date of Patent: Aug. 5, 2014

(54) DEVICE FOR AND METHOD OF MEASURING SIMILARITY BETWEEN SETS

(75) Inventors: Steven W. Knox, Woodbine, MD (US); Richard M. Bates, Greenbelt, MD (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 700 days.

(21) Appl. No.: 12/803,032

(22) Filed: Nov. 19, 2010

Related U.S. Application Data

(60) Provisional application No. 61/284,144, filed on Nov. 20, 2009.

(51) Int. Cl.
  *G06F 7/00* (2006.01)
  *G06F 17/15* (2006.01)
(52) U.S. Cl.
  USPC .......................................... 708/200; 708/422

(58) Field of Classification Search
  USPC ........................................ 708/200, 422, 424
  See application file for complete search history.

(56) References Cited

U.S. PATENT DOCUMENTS

| | | | |
|---|---|---|---|
| 5,953,006 A | 9/1999 | Baker et al. | |
| 6,240,409 B1 | 5/2001 | Aiken | |
| 6,990,628 B1 * | 1/2006 | Palmer et al. | 715/234 |
| 7,260,773 B2 | 8/2007 | Zernik | |
| 2003/0145278 A1 * | 7/2003 | Nielsen | 715/511 |

* cited by examiner

*Primary Examiner* — Chuong D Ngo
(74) *Attorney, Agent, or Firm* — Robert D. Morelli

(57) ABSTRACT

The present invention is a device for and method of measuring similarity between sets using a union block, three function blocks, an adder, a subtractor, and a divider. The first set is fed into the first function block and the first input of the union block. The second set is fed into the second function block and the second input of the union block. The output of the union block is fed into the input of the third function block. The outputs of the first and second function block feed into the adder. The output of the adder and the output of the third function block feed into the subtractor. The output of the subtractor feeds into the input of the divider.

25 Claims, 9 Drawing Sheets

DEVICE FOR AND METHOD OF MEASURING SIMILARITY BETWEEN SETS

CROSS-REFERENCE TO RELATED APPLICATIONS

This application claims the benefit of Provisional U.S. Application Ser. No. 61/284,144, filed Nov. 20, 2009, which is incorporated by reference herein.

FIELD OF INVENTION

The present invention relates, in general, to data processing: database and file management or data structures, and in particular to sorting.

BACKGROUND OF THE INVENTION

Computing similarity between sets is critical for managing and sorting through massive amounts of data. This data can come from multiple sources, some of which overlap. The current methods and devices for sorting rely on the Jaccard index as a base for determining similarity, but computing the Jaccard index requires knowledge of the intersections of two sets, a quantity not automatically known. There exists a need to be able to measure similarity between sets without knowing the intersection of data sets. The present invention does just that.

U.S. Pat. No. 6,240,409, entitled "METHOD AND APPARATUS FOR DETECTING AND SUMMARIZING DOCUMENT SIMILARITY WITHIN LARGE DOCUMENT SETS," discloses a method for comparing an input file to a set of files. The comparison is achieved by splitting up the document into substrings and compares it to substrings from the set. U.S. Pat. No. 6,240,409 is hereby incorporated by reference into the present specification.

U.S. Pat. No. 5,953,006, entitled "METHODS AND APPARATUS FOR DETECTING AND DISPLAYING SIMILARITIES IN LARGE DATA SETS," discloses a method for determining similarities between sets using dotplots. These dotplots graphically display how similar the different items in the sets are. U.S. Pat. No. 5,953,006 is hereby incorporated by reference into the present specification.

U.S. Pat. No. 7,260,773, entitled "DEVICE SYSTEM AND METHOD FOR DETERMINING DOCUMENT SIMILARITIES AND DIFFERENCES," discloses a method to determine the similarity between sets of documents by dividing each document into subsections. The subsections are then compared to determine similarity. U.S. Pat. No. 7,260,773 is hereby incorporated by reference into the present specification.

SUMMARY OF THE INVENTION

It is an object of the present invention to measure similarity between sets.

It is another object of the present invention to measure similarity between sets without knowing the intersection of the sets.

The present invention is a device for and method of measuring the similarity between sets.

The device of the present invention includes a union block, having a first input, a second input, and an output.

The device further includes a first function block, having a first input connected to the first input of the union block, having a second input, and having an output.

The device further includes a second function block, having a first input connected to the second input of the union block, having a second input connected to the second input of the first function block, and having an output.

The device further includes a third function block, having a first input connected to the output of the union block, having a second input connected to the second in put of the first function block, and having an output.

The device further includes an adder, having a first input connected to the output of the first function block, having a second input connected to the output of the second function block, and having an output.

The device further includes a subtractor, having a first input connected to the output of the adder, having a second input connected to the output of the third function block, and having an output.

The device further includes a divider, having a first input connected to the output of the subtractor, having a second input connected to the output of the third function block, and having an output.

The first step of the method of measuring similarity between sets is receiving a first set of items, a second set of items, and a dictionary of terms.

The second step of the method is calculating a union or concatenation of the first set and the second set.

The third step of the method is performing a user-definable, non-linear mathematical operation, based upon the dictionary of terms, on the union or concatenation of the first set and the second set.

The fourth step of the method is performing a user-definable, non-linear mathematical operation, based upon the dictionary of terms, on the first set.

The fifth step of the method is performing a user-definable, non-linear mathematical operation, based upon the dictionary of terms, on the second set.

The sixth step of the method is adding the results of the fourth and fifth steps.

The seventh step of the method is subtracting the results of the third step from the results of the sixth step.

The eighth step of the method is dividing the results of the seventh step by the results of the third step.

The ninth step of the method is dividing the results of the seventh step by the results of the fifth step.

The tenth step of the method is returning the result of the eighth or ninth step as the similarity between the first and second sets.

DETAILED DESCRIPTION

The present invention is a device for and method of measuring similarity between sets of items. The items may be but are not limited to documents attributed to a same author; queries, made to a database or computer search tools, attributed to the same user; genes in genome-wide association studies; reports which cite a same source; reports which pertain to a same topic; communications metadata possessing a same metadata subfield; data elements for friends of a same individual; data elements for individuals within a same social group; data elements for individuals who purchase a same commodity; data elements for commodities purchased by a same individual; data elements for genes from an individual; data elements for people from a same family; and data elements for genes from individuals with a same disease.

Figure 1:
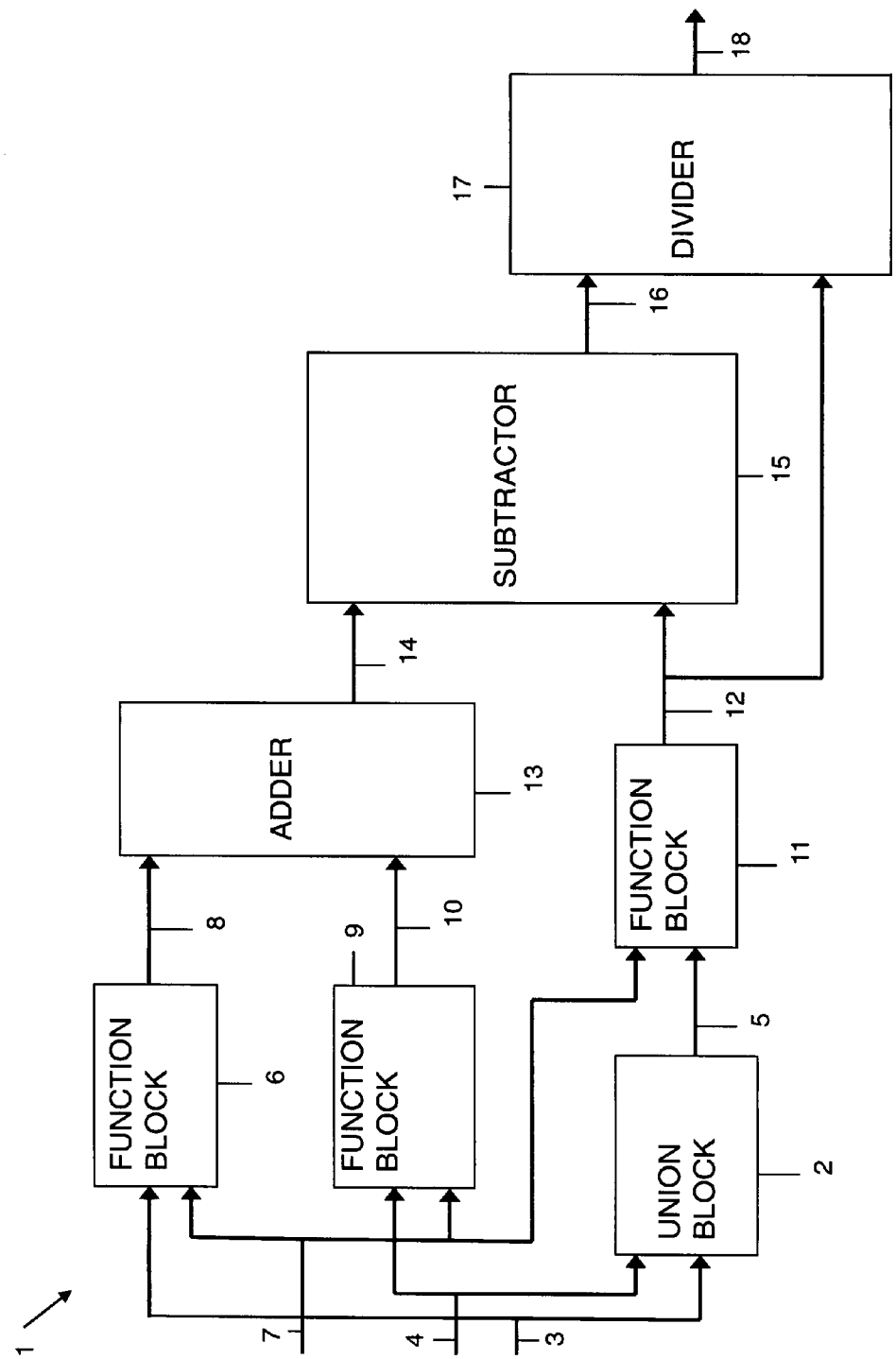
FIG. 1 is a schematic of the preferred embodiment of the present invention.

FIG. 1 is a schematic of the device 1 of the preferred embodiment of the present invention.

The device 1 represents the preferred embodiment of the present invention. It contains a union block 2. The union block 2 has a first input 3, a second input 4, and an output 5. In the preferred embodiment, the union block 2 computes the mathematical union of the first input 3 and the second input 4 and outputs the result on the output 5. The union of two sets is mathematical operation in set theory. For example, {1, 2, 3} union {3, 4, 5} is {1, 2, 3, 4, 5}. In an alternate embodiment, the union block 2 computes the concatenation, such that duplicate items are allowed, of the first input 3 and the second input 4 and outputs the result on the output 5.

The device 1 includes a first function block 6. The first function block 6 has a first input connected to the first input 3 of the union block 2, a second input 7, and an output 8. The first function block 6 computes a user-definable, non-linear mathematical operation between the two inputs and outputs the results on the output 8. The user-definable, non-linear mathematical operation computes the information measure contained in first input connected to the first input 3 of the union block 2 with respect to the second input 7.

The device 1 includes a second function block 9. The second function block 9 has a first input connected to the second input 4 of the union block 2, a second input connected to the second input 7 of the first function block 6, and an output 10. The second function block 9 computes a user-definable, non-linear mathematical operation between the two inputs and outputs the results on the output 10. The user-definable, non-linear mathematical operation computes the information measure contained in first input connected to the second input 4 of the union block 2 with respect to the second input connected to the second input 7 of the first function block 6.

The device 1 includes a third function block 11. The third function block 11 has a first input connected to the output 5 of the union block 2, a second input connected to the second input 7 of the first function block 6, and an output 12. The third function block 11 computes a user-definable, non-linear mathematical operation between the two inputs and outputs the results on the output 12. The user-definable, non-linear mathematical operation computes the information measure contained in first input connected to the output 5 of the union block 2 with respect to the second input connected to the second input 7 of the first function block 6.

The device 1 includes an adder 13. The adder 13 has a first input connected to the output 8 of the first function block 6, a second input connected to the output 10 of the second function block 6, and an output 14. The adder 13 adds the two inputs and outputs the result on the output 14.

The device 1 includes a subtractor 15. The subtractor 15 has a first input connected to the output 12 of the third function block 11, a second input connected to the output 14 of the adder 13, and an output 16. The subtractor 15 subtracts the first input connected to the output 12 of the third function block 11 from the second input connected to the output 14 of the adder 13 and outputs the result on the output 16.

The device 1 includes a divider 17. The divider 17 has a first input connected to the output 12 of the third function block 11, a second input connected to the output 16 of the subtractor 15, and an output 18. The divider 17 divides the second input connected to the output 16 of the subtractor 15 by the first input connected to the output 12 of the third function block 11 and outputs the result on the output 18.

Figure 2:
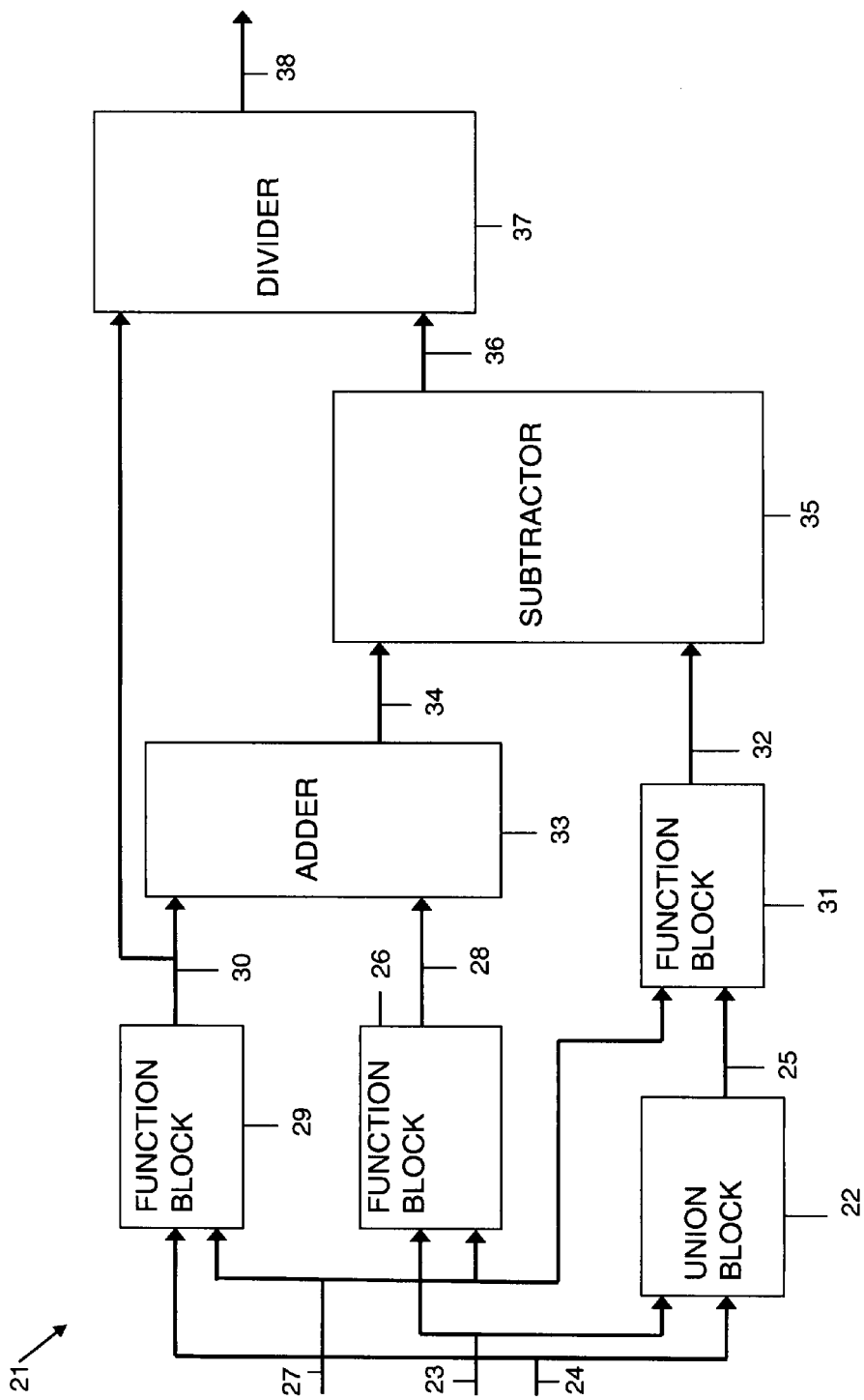
FIG. 2 is a schematic of an alternate embodiment of the present invention.

FIG. 2 is a schematic of the device 21 of an alternate embodiment of the present invention.

The device 21 represents an alternate embodiment of the present invention. It contains a union block 22. The union block 22 has a first input 23, a second input 24, and an output 25. In the preferred embodiment, the union block 22 computes the mathematical union of the first input 23 and the second input 24 and outputs the result on the output 25. In an alternate embodiment, the union block 22 computes a concatenation of the first input 23 and the second input 24 and outputs the result on the output 25.

The device 21 includes a first function block 26. The first function block 26 has a first input connected to the first input 23 of the union block, a second input 27, and an output 28. The first function block 26 computes a user-definable, non-linear mathematical operation between the two inputs and outputs the results on the output 28. The user-definable, non-linear mathematical operation computes the information measure contained in first input connected to the first input 23 of the union block 22 with respect to the second input 27.

The device 21 includes a second function block 29. The second function block 29 has a first input 24, a second input 27, and an output 30. The second function block 29 computes a user-definable, non-linear mathematical operation between the two inputs and outputs the results on the output 30. The user-definable, non-linear mathematical operation computes the information measure contained in first input connected to the second input 34 of the union block 22 with respect to the second input connected to the second input 27 of the first function block 26.

The device 21 includes a third function block 31. The third function block 31 has a first input 25, a second input 27, and an output 32. The third function block 31 computes a user-definable, non-linear mathematical operation between the two inputs and outputs the results on the output 32. The user-definable, non-linear mathematical operation computes the information measure contained in first input connected to the output 25 of the union block 22 with respect to the second input connected to the second input 27 of the first function block 26.

The device 21 includes an adder 33. The adder 33 has a first input connected to the output 28 of the first function block 26, a second input connected to the output 30 of the second function block 29, and an output 34. The adder 33 adds the two inputs and outputs the result on the output 34.

The device 21 includes a subtractor 35. The subtractor 35 has a first input connected to the output 32 of the third function block 31, a second input connected to the output 34 of the adder 33, and an output 36. The subtractor 35 subtracts the first input connected to the output 32 of the third function block 31 from the second input connected to the output 34 of the adder 33 and outputs the result on the output 36.

The device 21 includes a divider 37. The divider 37 has a first input connected to the output 30 of the second function block 29, a second input connected to the output 36 of the subtractor 35, and an output 38. The divider 37 divides the second input connected to the output 36 of the subtractor 35 by the first input first input connected to the output 30 of the second function block 29 and outputs the result on the output 38.

Figure 3:
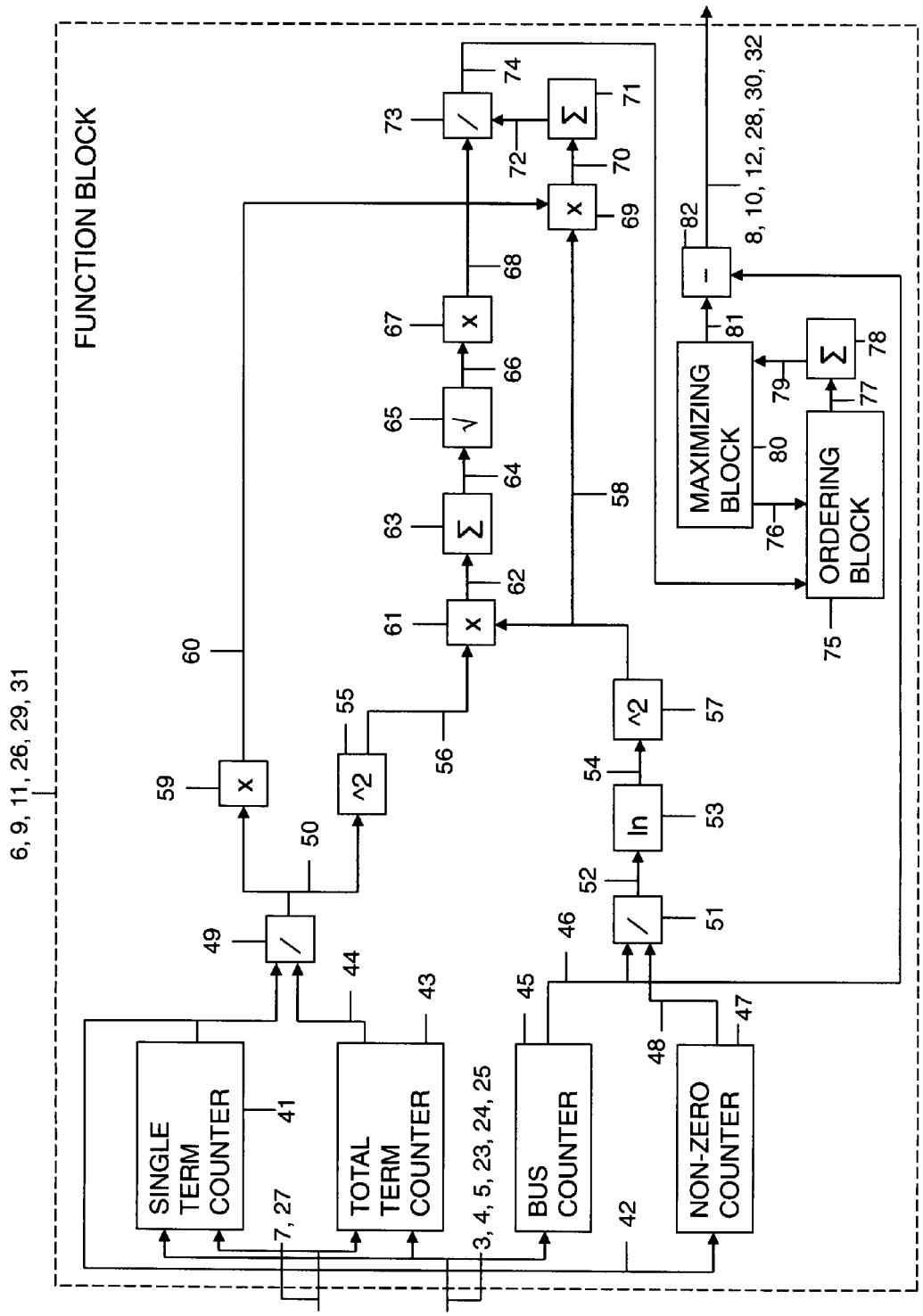
FIG. 3 is a schematic of a preferred embodiment of the function block.

FIG. 3 is a schematic of the function block 6, 9, 11, 26, 29, and 31 of a preferred embodiment of the present invention.

The function block 6, 9, 11, 26, 29, and 31 includes a single term counter 41. The single term counter 41 has a first input bus 3, 4, 5, 23, 24, and 25, a second input bus 7 and 27, and an output bus 42. The first input bus 3, 4, 5, 23, 24, and 25 accepts a set of items. The second input bus 7 and 27 accepts a dictionary of terms. The single term counter 41 counts the frequency of each term in each item and outputs the result on the output bus 42.

The function block 6, 9, 11, 26, 29, and 31 includes a total term counter 43. The total term counter 43 has a first input bus connected to the first input bus 3, 4, 5, 23, 24, and 25 of the single term counter 41, a second input bus connected to the second input bus 7 and 27 of the single term counter 41, and an output bus 44. The first input bus connected to the first input bus 3, 4, 5, 23, 24, and 25 of the single term counter 41 accepts a set of items. The second input bus connected to the second input bus 7 and 27 of the single term counter 41 accepts a dictionary of terms. The total term counter 43 counts the total number of all terms in each item and outputs the result on the output bus 44.

The function block 6, 9, 11, 26, 29, and 31 includes a bus counter 45. The bus counter 45 has an input bus connected to the first input bus 3, 4, 5, 23, 24, and 25 of the single term counter 41 and an output 46. The input bus connected to the first input bus 3, 4, 5, 23, 24, and 25 of the single term counter 41 accepts a set of items and the bus counter 45 outputs the total number of items on the output 46.

The function block 6, 9, 11, 26, 29, and 31 includes a non-zero counter 47. The non-zero counter 47 has an input bus connected to the output bus 42 of the single term counter and an output bus 48. The non-zero counter 47 counts the number of non-zero term frequencies in each item of the set and outputs the result on the output bus 48.

The function block 6, 9, 11, 26, 29, and 31 includes a first divider 49. The first divider 49 has a first input bus connected to the output bus 42 of the single term counter 41, a second input bus connected to the output bus 44 of the total term counter, and an output bus 50. The first divider 49 divides the frequency of each term in each item by the total number of terms in each item and outputs the result on the output bus 50.

The function block 6, 9, 11, 26, 29, and 31 includes a second divider 51. The second divider 51 has a first input connected to the output bus 46 of the bus counter 45, a second input bus connected to the output bus 48 of the non-zero counter 47, and an output bus 52. The second divider 51 divides the number of non-zero term frequencies in each item by the corresponding number of items in each set and outputs the result on the output bus 52.

The function block 6, 9, 11, 26, 29, and 31 includes a natural log block 53. The natural log block 53 has an input bus connected to the output bus 52 of the second divider 51 and an output bus 54. The natural log block 53 computes the natural log of each input and outputs the result on the output bus 54.

The function block 6, 9, 11, 26, 29, and 31 includes a first squaring block 55. The first squaring block 55 has an input bus connected to the output bus 50 of the first divider 49 and an output bus 56. The first squaring block 55 computes the square of each input and outputs the result on the output bus 56.

The function block 6, 9, 11, 26, 29, and 31 includes a second squaring block 57. The second squaring block 57 has an input bus connected to the output bus 54 of the natural log block 53 and an output bus 58. The second squaring block 57 computes the square of each input and outputs the result on the output bus 58.

The function block 6, 9, 11, 26, 29, and 31 includes a first multiplier 59. The first multiplier 59 has an input bus connected to the output bus 50 of the first divider 49 and an output bus 60. The input to the first multiplier 59 consists of numbers corresponding to each term/item pair and outputs the product of each unique item pair for the same term.

The function block 6, 9, 11, 26, 29, and 31 includes a second multiplier 61. The second multiplier 61 has a first input bus connected to the output bus 56 of the first squaring block 55, a second input bus connected to the output bus 58 of the second squaring block 57, and an output bus 62. The first input bus connected to the output bus 56 of the first squaring block 55 contains numbers corresponding to each term/item and the second input bus connected to the output bus 58 of the second squaring block 57 consists of numbers corresponding to each term. The output of the second multiplier 61 consists of product pairs where each term/item input is multiplied by the corresponding term input.

The function block 6, 9, 11, 26, 29, and 31 includes a first summing block 63. The first summing block 63 has an input bus connected to the output bus 62 of the second multiplier 61 and an output bus 64. The input to the first summing block 63 consists of numbers corresponding to each item/term pair and the first summing block 63 sums each item set over the whole dictionary of terms.

The function block 6, 9, 11, 26, 29, and 31 includes a square root block 65. The square root block 65 has an input bus connected to the output bus 64 of the first summing block 63 and an output bus 66. The square root block 65 computes the square root of each input on the input bus connected to the output bus 64 of the first summing block 63 and, outputs the result on the output bus 66.

The function block 6, 9, 11, 26, 29, and 31 includes a third multiplier 67. The third multiplier 67 has an input bus connected to the output bus 66 of the square root block 65 and an output bus 68. The input to the third multiplier 67 contains numbers corresponding to each item and outputs products which each contain different item pairs.

The function block 6, 9, 11, 26, 29, and 31 includes a fourth multiplier 69. The fourth multiplier 69 has a first input bus connected to the output bus 58 of the second squaring block 57, a second input bus connected to the output bus 60 of the first multiplier 59, and an output bus 70. The first input connected to the output bus 58 of the second squaring block 57 consists of numbers each containing different combinations of two items and one term. The second input bus connected to the output bus 60 of the first multiplier 59, and an output bus 70 consists of numbers which each correspond to a term. The fourth multiplier 69 computes products which match up the inputs based upon the common term.

The function block 6, 9, 11, 26, 29, and 31 includes a second summing block 71. The second summing block has an input bus connected to the output bus 70 of the fourth multiplier 69 and an output bus 72. The input bus connected to the output bus 70 of the fourth multiplier 69 and an output bus 72 to the second summing block 71 consists of numbers each with different combinations of two items and one term. The second summing block 71 sums the group of numbers which correspond to the same two items over the dictionary of terms.

The function block 6, 9, 11, 26, 29, and 31 includes a third divider 73. The third divider 73 has a first input bus connected to the output bus 68 of the third multiplier 67, a second input bus connected to the output bus 72 of the second summing block 71, and an output bus 74. Each input bus to the third divider 73 contains a different item pair. The third divider 73 divides an item pair from the second input bus connected to the output bus 72 of the second summing block 71 by the same item pair from the first input bus connected to the output bus 68 of the third multiplier 67.

The function block 6, 9, 11, 26, 29, and 31 includes an ordering block 75. The ordering block 75 has a first input bus connected to the output bus 74 of the second divider 73, a second input 76, and an output bus 77. The ordering block 75 proposes and ordering of items and has as its output that subset of the inputs from the first input bus connected to the output bus 74 of the second divider 73 corresponding to the similarities of the adjacent pairs of items in the proposed order.

The function block 6, 9, 11, 26, 29, and 31 includes a third summing block 78. The third summing block 78 has an input bus connected to the output bus 77 of the ordering block 75 and an output 79. The third summing block sums all the inputs.

The function block 6, 9, 11, 26, 29, and 31 includes a maximizing block 80. The maximizing block 80 has an input connected to the output 79 of the third summing block 78, a first output connected to the second input 76 of the ordering block 75 and a second output 81. The maximizing block 80 compares the numbers received on the input connected to the output 79 of the third summing block 78 and outputs the largest one on the output 81.

The function block 6, 9, 11, 26, 29, and 31 includes a subtractor 82. The subtractor 82 has a first input connected to the output 46 of the bus counter 45, a second input connected to the output 81 of the maximizing block 80, and an output 8, 10, 12, 28, 30, and 32. The subtractor 82 subtracts the second input connected to the output 81 of the maximizing block 80 from the first input connected to the output 46 of the bus counter 45.

Figure 4:
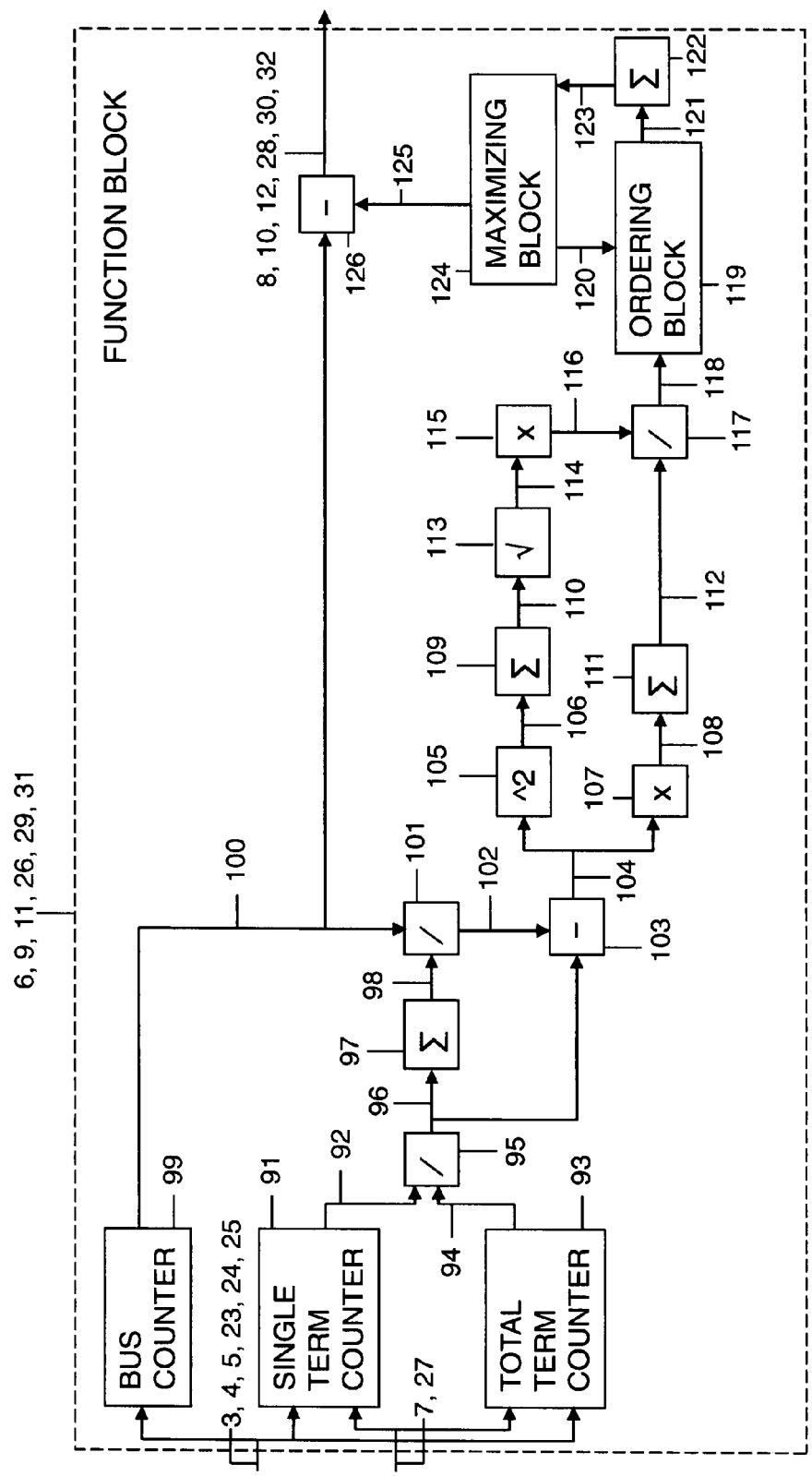
FIG. 4 is a schematic of an alternate embodiment of the function block.

FIG. 4 is a schematic of the function block 6, 9, 11, 26, 29, and 31 of an alternate embodiment of the present invention.

The function block 6, 9, 11, 26, 29, and 31 includes a single term counter 91. The single term counter 91 has a first input bus 3, 4, 5, 23, 24, and 25, a second input bus 7 and 27, and an output bus 92. The first input bus 3, 4, 5, 23, 24, and 25 accepts a set of items. The second input bus 7 and 27 accepts a dictionary of terms. The single term counter 91 counts the frequency of each term in each item and outputs the result on the output bus 92.

The function block 6, 9, 11, 26, 29, and 31 includes a total term counter 93. The total term counter 93 has a first input bus connected to the first input bus 3, 4, 5, 23, 24, and 25 of the single term counter 91, a second input bus connected to the second in put bus 7 and 27 of the single term counter 91, and an output bus 94. The first input bus connected to the first input bus 3, 4, 5, 23, 24, and 25 of the single term counter 91 accepts a set of items. The second input bus connected to the second in put bus 7 and 27 of the single term counter 91 accepts a dictionary of terms. The total term counter 93 counts the total number of all terms in each item and outputs the result on the output bus 94.

The function block 6, 9, 11, 26, 29, and 31 includes a first divider 95. The first divider 95 has a first input bus connected to the output bus 92 of the single term counter 91, a second input bus connected to the output bus 94 of the total term counter 93, and an output bus 96. The first divider 95 divides the frequency of each term in each item by the total number of terms in each item and outputs the result on the output bus 96.

The function block 6, 9, 11, 26, 29, and 31 includes a first summing block 97. The first summing block 97 has an input bus connected to the output bus 96 of the first divider 95 and an output bus 98. The input bus connected to the output bus 96 of the first divider 95 to the first summing block 97 consists of numbers corresponding to different term/item pairs. The first summing block 97 sums the groups with similar terms over the set of items.

The function block 6, 9, 11, 26, 29, and 31 includes a bus counter 99. The bus counter 99 has an input bus connected to the first input bus 3, 4, 5, 23, 24, and 25 of the single term counter 91 and an output 100. The input bus connected to the first input bus 3, 4, 5, 23, 24, and 25 of the single term counter 91 accepts a set of items and the bus counter 99 outputs the total number of items on the output 100.

The function block 6, 9, 11, 26, 29, and 31 includes a second divider 101. The second divider 101 has a first input bus connected to the output bus 98 of the first summing block 97, a second input connected to the output 100 of the bus counter 99, and an output bus 102. The second divider 101 divides each number on the first input bus connected to the output bus 98 of the first summing block 97 by the second input connected to the output 100 of the bus counter 99.

The function block 6, 9, 11, 26, 29, and 31 includes a first subtractor 103. The first subtractor 103 has a first input bus connected to the output bus 96 of the first divider 95, a second input bus connected to the output bus 102 of the second divider 101, and an output bus 104. The first input bus connected to the output bus 96 of the first divider 95 consists of numbers which each correspond to a different term/item pair, and the second input bus connected to the output bus 102 of the second divider 101 consists of numbers which correspond to different terms. The first subtractor 103 takes each number on the first input bus connected to the output bus 96 of the first divider 95 and subtracts the number on the second input bus connected to the output bus 102 of the second divider 101 which has the same term.

The function block 6, 9, 11, 26, 29, and 31 includes a squaring block 105. The squaring block 105 has an input bus connected to the output bus 104 of the first subtractor 103 and an output bus 106. The squaring block 105 squares each input.

The function block 6, 9, 11, 26, 29, and 31 includes a first multiplier 107. The first multiplier 107 has an input bus connected to the output bus 104 of the first subtractor 103 and an output bus 108. The input bus connected to the output bus 104 of the first subtractor 103 consists of numbers corresponding to unique item/term pairs. The first multiplier 107 computes products which each contain numbers with identical terms and different items.

The function block 6, 9, 11, 26, 29, and 31 includes a second summing block 109. The second summing block 109 has an input bus connected to the output bus 106 of the squaring block 105 and an output bus 110. The second summing block 109 sums inputs consisting of item/term pairs over the dictionary of terms.

The function block 6, 9, 11, 26, 29, and 31 includes a third summing block 111. The third summing block 111 has an input bus connected to the output bus 108 of the first multiplier 107 and an output bus 112. The input bus connected to the output bus 108 of the first multiplier 107 contains numbers corresponding to an item pair and a term. The third summing block 111 sums the numbers with the same item pair over the dictionary of terms.

The function block 6, 9, 11, 26, 29, and 31 includes a square root block 113. The square root block 113 has an input bus connected to the output bus 110 of the second summing block 109 and an output bus 114. The square root block 113 computes the square root of each input.

The function block 6, 9, 11, 26, 29, and 31 includes a second multiplier 115. The second multiplier 115 has an input bus connected to output bus 114 of the square root block 113 and an output bus 116. The input bus connected to output bus 114 of the square root block 113 consists of numbers each corresponding to a different item. The second multiplier 115 computes products which each contain a different item pair.

The function block 6, 9, 11, 26, 29, and 31 includes a third divider 117. The third divider 117 has a first input bus connected to the output bus 112 of the third summing block 111, a second input bus connected to the output bus 116 of the second multiplier 115, and an output bus 118. The first input bus connected to the output bus 112 of the third summing block 111 and the second input bus connected to the output bus 116 of the second multiplier 115 each contain numbers corresponding to different pairs of items. The third divider 117 divides numbers from the first input bus connected to the output bus 112 of the third summing block 111 by the numbers from the second input bus connected to the output bus 116 of the second multiplier 115 which correspond to the same pair of items.

The function block 6, 9, 11, 26, 29, and 31 includes an ordering block 119. The ordering block 119 has a first input bus connected to the output bus 118 of the third divider 117, a second input 120, and an output bus 121. The ordering block 119 proposes and ordering of items and has as its output that subset of the inputs from the first input bus connected to the output bus 118 of the second divider 117 corresponding to the similarities of the adjacent pairs of items in the proposed order.

The function block 6, 9, 11, 26, 29, and 31 includes a fourth summing block 122. The fourth summing block 122 has an input bus connected to the output bus 121 of the ordering block 119 and an output 123. The fourth summing block 122 sums all the inputs.

The function block 6, 9, 11, 26, 29, and 31 includes a maximizing block 124. The maximizing block 124 has an input connected to the output 123 of the fourth summing block 122, a first output connected to the second input 120 of the ordering block 119 and a second output 125. The maximizing block 124 compares the numbers received on input connected to the output 123 of the fourth summing block 122 and outputs the largest one on the second output 125.

The function block 6, 9, 11, 26, 29, and 31 includes a subtractor 126. The subtractor 126 has a first input connected to the output 100 of the bus counter 99, a second input connected to the output 125 of the maximizing block 124, and an output 8, 10, 12, 28, 30, and 32. The subtractor 126 subtracts the second input connected to the output 125 of the maximizing block 124 from the first input connected to the output 100 of the bus counter 99.

Figure 5:
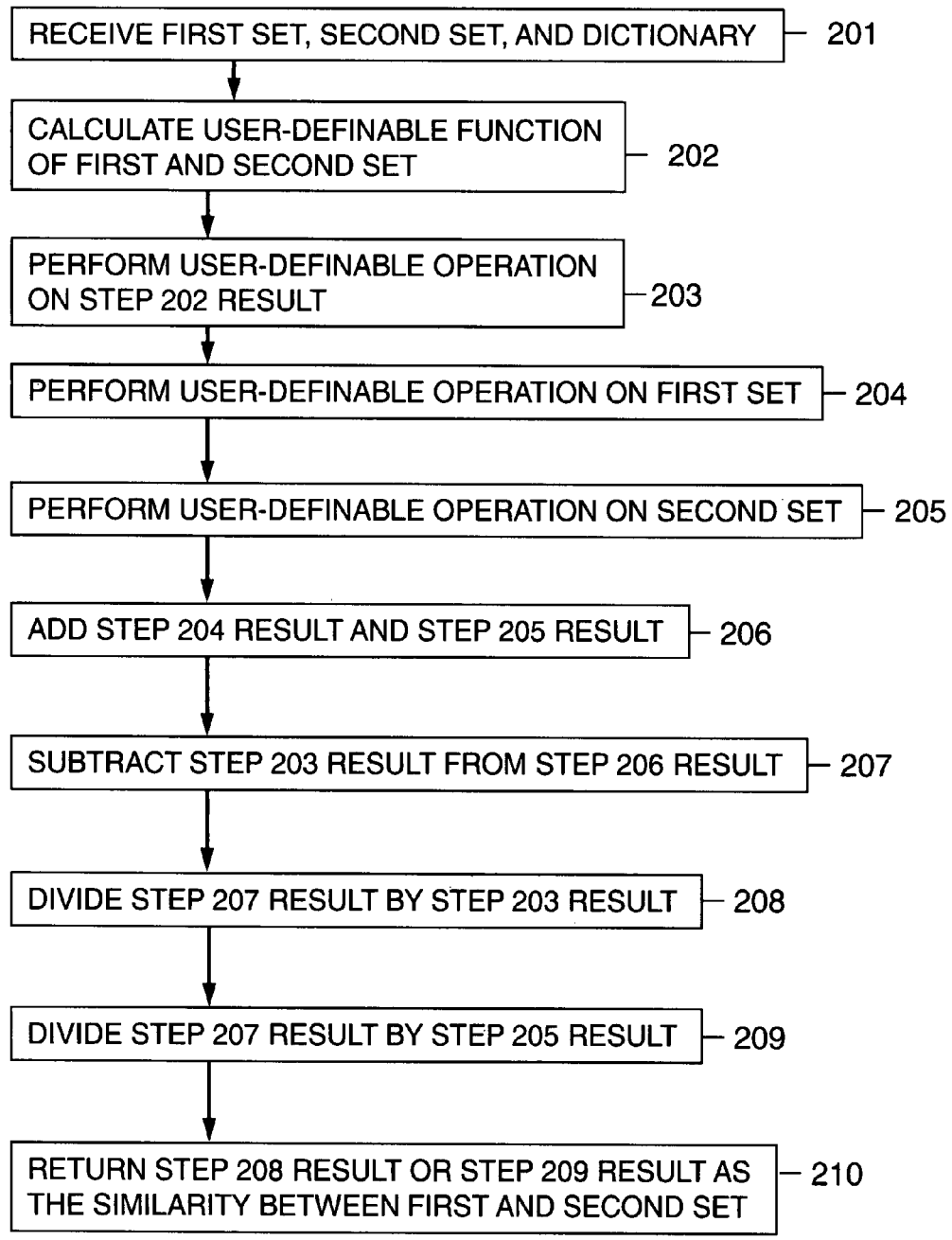
FIG. 5 is a flowchart of the steps of the present invention.

FIG. 5 is a flowchart of the method of the present invention.

The first step 201 of the method is receiving a first set, a second set, and a dictionary of terms. The items in each of the sets can consist of documents attributed to a same author; queries, made to a database or computer search tools, attributed to the same user; genes in genome-wide association studies; reports which cite a same source; reports which pertain to a same topic; communications metadata possessing a same metadata subfield; data elements for friends of a same individual; data elements for individuals within a same social group; data elements for individuals who purchase a same commodity; data elements for commodities purchased by a same individual; data elements for genes from an individual; data elements for people from a same family; and data elements for genes from individuals with a same disease. The dictionary of terms can contain different words, numbers, or any other term which can be counted in a set of items; a set of coordinate weights when the data elements are feature vectors and the measure is cosine similarity; or a confusion matrix which specifies the similarity between the data-elements indexed by the rows and the data-elements indexing the columns such as are used when the data-elements are phonemes.

The second step 202 of the method is calculating the union of a first set and a second set. In the preferred embodiment, the union is a mathematical union based upon set theory. In an alternate embodiment, the union is a concatenation of the first set and the second set.

The third step 203 of the method is performing a user-definable, non-linear mathematical operation, based upon the dictionary of terms, on the union of the first set and the second set. This operation computes the information measure contained in the union of the first set and the second set.

The fourth step 204 of the method is performing a user-definable, non-linear mathematical operation, based upon the dictionary of terms, on the first set. This operation computes the information measure contained in the first set.

The fifth step 205 of the method is performing a user-definable, non-linear mathematical operation, based upon the dictionary of terms, on the second set. This operation computes the information measure contained in the second set.

The sixth step 206 of the method is adding the results from step 204 and step 205.

The seventh step 207 of the method is subtracting the results from step 203 from the results from step 206.

The eighth step 208 of the method is dividing the results from step 207 by the results from step 203.

The ninth step 209 of the method is dividing the results from step 207 by the results from step 205.

The tenth step 210 of the method is returning the result of step 208 or the result of step 209 as the similarity between the first and second sets.

Figure 6A:
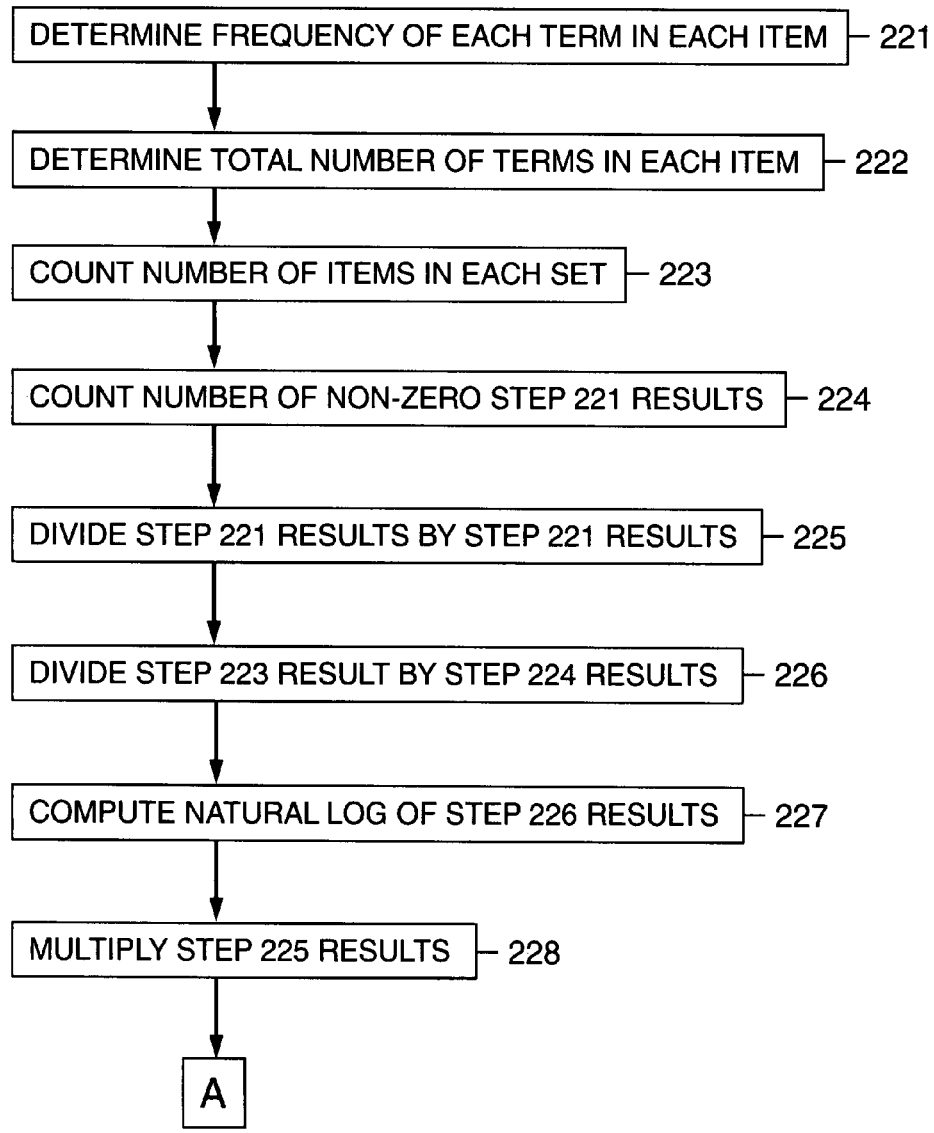
FIG. 6 is a flowchart of the steps of a preferred embodiment of the determine information steps.
Figure 6B:
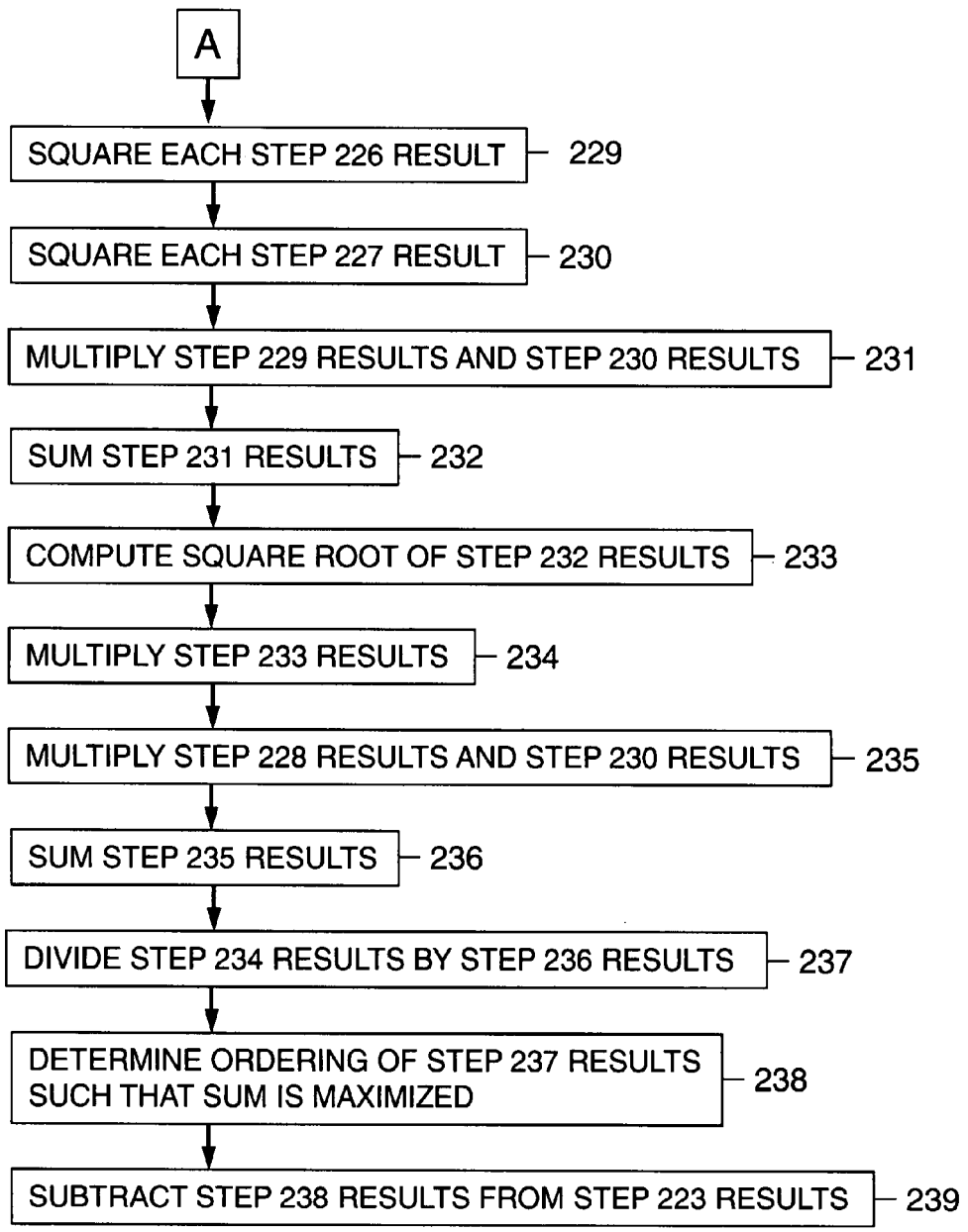

FIG. 6 is a flowchart of the steps 203, 204, and 205 of a first embodiment of the present invention.

The first step 221 of the method is determining the frequencies of occurrence of each term in each item of the set.

The second step 222 of the method is determining the total number of terms in each item of the set.

The third step 223 of the method is counting the number of items in the set.

The fourth step 224 of the method is counting the number, of non-zero results from step 221.

The fifth step 225 of the method is dividing the results from step 221 by the results from step 222. The results from step 221 correspond to the frequency of each term in each item and the results from step 222 correspond to the total number of terms in each item. The fifth step 225 divides the results from step 221 by the results from step 222 which correspond to the same item.

The sixth step 226 of the method is dividing the result from step 223 by each result from step 224.

The seventh step 227 of the method is computing the natural log of each result from step 226.

The eighth step 228 of the method is multiplying the results from step 225. The eighth step 228 multiplies the results from step 225 such that each product contains a different combination of an item pair and a term.

The ninth step 229 of the method is squaring each result from step 226.

The tenth step 230 of the method is squaring each result from step 227.

The eleventh step 231 of the method is multiplying the results from step 229 and the results from step 230. The results from step 230 each correspond to a term and the results from step 229 each correspond to a unique term, item pair.

The eleventh step 231 multiplies each result from step 229 by the corresponding number from step 230.

The twelfth step 232 of the method is summing the results from step 231. The twelfth step 232 sums over the dictionary of terms.

The thirteenth step 233 of the method is computing the square root of the results from step 232.

The fourteenth step 234 of the method is multiplying the results from step 233. The results from step 233 each correspond to an item. The fourteenth step 234 computes product pairs which each contain a unique item pair.

The fifteenth step 235 of the method is multiplying the results from step 228 and the results from step 230. The results from step 230 each correspond to a term and the results from step 228 each correspond to a unique item pair and term trio. The fifteenth step 235 computes products which each contain the step 228 result and the corresponding step 230 result.

The sixteenth step 236 of the method is summing the results from step 235. The sixteenth step 236 sums over the dictionary of terms and the results contain unique item pairs.

The seventeenth step 237 of the method is dividing the results from step 234 by the results from step 236. The results from step 234 and the results from step 236 both contain unique item pairs. The seventeenth step 237 computes quotients which contain those same unique item pairs.

The eighteenth step 238 of the method is determining an ordering of the results from step 237 such that the sum of a particular subset of the results from step 237 is maximized. The eighteenth step 238 is a traveling salesman problem and can be solved by the Greedy Algorithm solution, the "2-opt" solution, the Simulated Annealing solution, the "K-opt" solution, the Lin-Kernighan solution, Lin-Kernighan-Johnson solution or any other solution know to those skilled in the art.

The nineteenth step 239 of the method is subtracting the result of step 238 from the result from step 223.

Figure 7A:
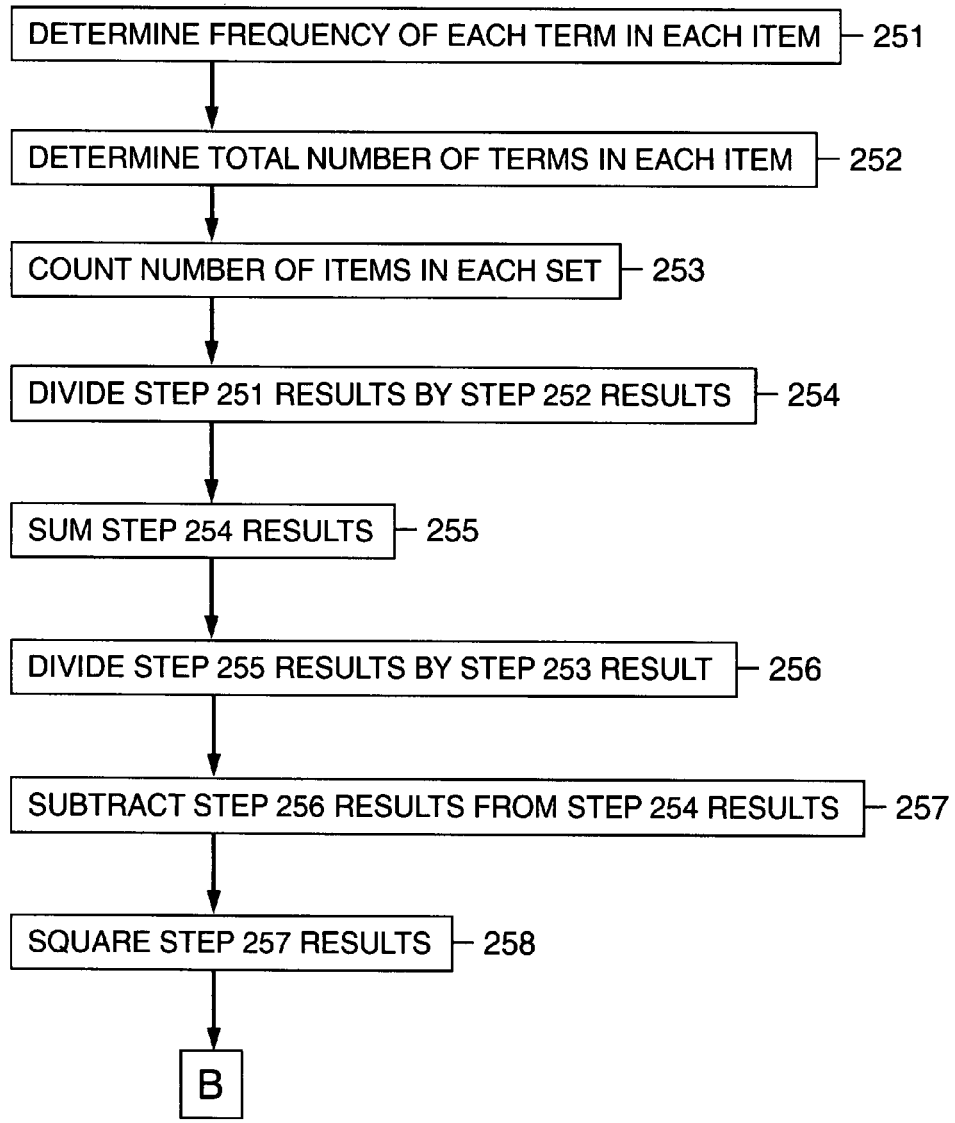
FIG. 7 is a flowchart of the steps of an alternate embodiment of the determine information steps.
Figure 7B:
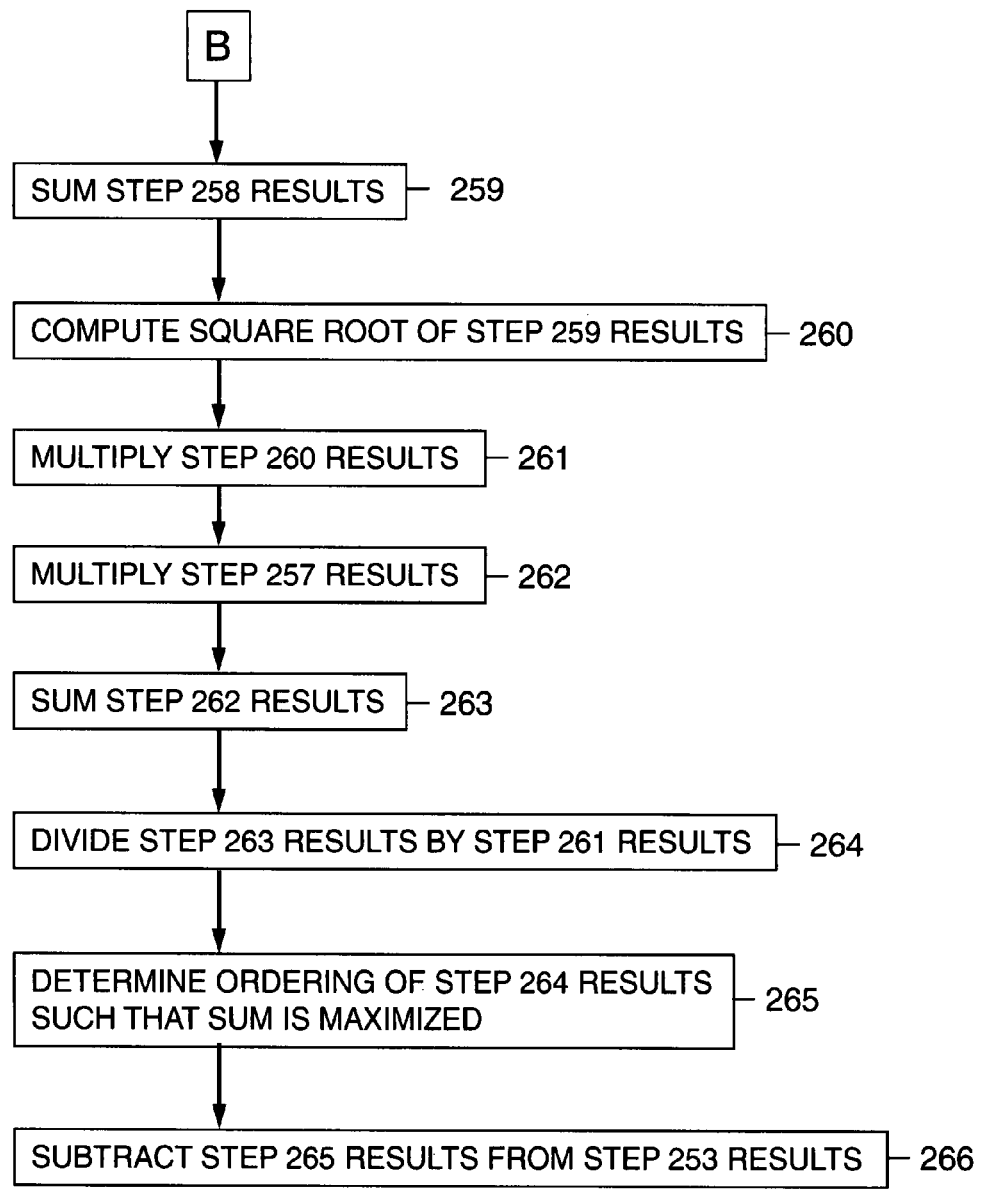

FIG. 7 is a flowchart of the steps 203, 204, and 205 of a second embodiment of the present invention.

The first step 251 of the method is determining the frequencies of occurrence of each term in each item of the set.

The second step 252 of the method is determining the total number of terms in each item of the set.

The third step 253 of the method is counting the number of items in the set.

The fourth step 254 of the method is dividing the results from step 251 by the results from step 252. The results from step 251 correspond to the frequency of each term in each item and the results from step 252 correspond to the total number of terms in each item. The fourth step 254 divides the results from step 251 by the results from step 252 which correspond to the same item.

The fifth step 255 of the method is summing the results from step 254. The fifth step 255 sums over the set of items.

The sixth step 256 of the method is dividing the results from step 256 by the result from step 254.

The seventh step 257 of the method is subtracting the results from step 256 from the result from step 254. The results from step 254 each correspond to a unique item/term pair and the results from step 256 each correspond to a term. The seventh step 257 computes results each contain unique item/term pairs.

The eighth step 258 of the method is squaring the results from step 257.

The ninth step 259 of the method is summing the results from step 258 over the dictionary of terms.

The tenth step 260 of the method is computing the square root of the results from step 259.

The eleventh step 261 of the method is multiplying the results from step 260. The eleventh step 261 computes results which contain unique item pairs.

The twelfth step 262 of the method is multiplying the results from step 257. The twelfth step 262 computes results which contain unique item pair, term trios.

The thirteenth step 263 of the method is summing the results from step 262 over the dictionary of terms.

The fourteenth step 264 of the method is dividing the results from step 263 by the results from step 261. The fourteenth step 264 computes quotients using numbers which contain the same item pair.

The fifteenth step 265 of the method is determining an ordering of the results from step 264 such that the sum a particular subset of the results from step 264 is minimized. The fifteenth step 265 is a traveling salesman problem and can be solved by the Greedy Algorithm solution, the "2-opt" solution, the Simulated Annealing solution, the "K-opt" solution, the Lin-Kernighan solution, Lin-Kernighan-Johnson solution or any other solution know to those skilled in the art.

The sixteenth step 266 of the method is subtracting the result of step 265 from the result from step 253.

What is claimed is:

1. A device for measuring similarity between a first set of items and a second set of items, comprising:
    a) a union block for performing a union function, having a first input for receiving the first set of items, a second input for receiving the second set of items, and having an output;
    b) a first function block for performing a user-definable non-linear function, having a first input connected to said first input of said union block, having a second input for receiving a dictionary of terms, and having an output;
    c) a second function block for performing the user-definable non-linear function, having a first input connected to said second input of said union block, having a second input connected to said second input of said first function block, and having an output;
    d) a third function block for performing the user-definable non-linear function, having a first input connected to said output of said union block, having a second input connected to said second input of said first function block, and having an output;
    e) an adder, having a first input connected to said output of said first function block, having a second input connected to said output of said second function block, and having an output;
    f) a subtractor, having a first input connected to said output of said third function block, having a second input connected to said output of said adder, and having an output; and
    g) a divider, having a first input connected to said output of said third function block, having a second input connected to said output of said subtractor, and having an output.

2. The device of claim 1 wherein said first input of said divider is connected to said output of said third function block.

3. The device of claim 2 wherein said first function block, said second function block, and said third function block each comprise:
    a) a single term counter for counting a frequency of occurrence of each item in a set, having a first input bus for receiving a set of items, a second input bus for receiving the dictionary of terms, and an output bus;
    b) a total term counter for counting a total number of terms in an item, having a first input bus connected to said first input bus of said single term counter, having a second input bus connected to said second input bus of said single term counter, and having an output bus;

c) a bus counter for counting a total number of items, having an input bus connected to said first input bus of said single term counter, and having an output;

d) a non-zero counter for counting a number of frequencies of occurrence of each item in a set that are non-zero, having an input bus connected to said output bus of said single term counter, and having an output bus;

e) a first divider, having a first input bus connected to said output bus of said single term counter, having a second input bus connected to said output bus of said total term counter, and having an output bus;

f) a second divider, having a first input connected to said output of said bus counter, having a second input bus connected to said output bus of said non-zero counter, and having an output bus;

g) a natural log block, having an input bus connected to said output of said second divider, and having an output bus;

h) a first squaring block, having an input bus connected to said output of said first divider, and having an output bus;

i) a second squaring block, having an input bus connected to said output bus of said natural log block, and having an output bus;

j) a first multiplier, having an input bus connected to said output bus of said first divider, and having an output bus;

k) a second multiplier, having a first input bus connected to said output of said first squaring block, having a second input bus connected to said output of said second squaring block, and having an output bus;

l) a first summing block, having a first input bus connected to said output bus of said second multiplier block, and having an output bus;

m) a square root block, having an input bus connected to said output bus of said first summing block, and having an output bus;

n) a third multiplier, having an input bus connected to said output bus of said square root block, and having an output bus;

o) a fourth multiplier, having a first input bus connected to said output of said second squaring block, having a second input bus connected to said output of said first multiplier, and having an output bus;

p) a second summing block, having an input bus connected to said output bus of said fourth multiplier, and having an output bus; and q) a third divider, having a first input bus connected to said output bus of said third multiplier, having a second input bus connected to said output bus of said second summing block, and having an output bus.

4. The device of claim 3 wherein said first function block, said second function block, and said third function block further each comprise:

a) an ordering block for ordering items received from the second divider, having a first input bus connected to said output of said second divider, having a second input, and having an output bus;

b) a third summing block for summing inputs received from the ordering block, having an input bus connected to said output bus of said ordering block, and having an output;

c) a maximizing block for identifying a largest input received from said third summing block, having an input connected to said output of said third summing block, having a first output connected to said input of said ordering block, and having a second output; and d) a second subtractor, having a first input connected to said output of said bus counter, having a second input connected to said second output of said maximizing block, and having an output.

5. The device of claim 2 wherein said first function block, said second function block, and said third function block each comprise:

a) a single term counter, having a first input bus, a second input bus, and an output bus;

b) a total term counter, having a first input bus connected to said first input bus of said single term counter, having a second input bus connected to said second input bus of said single term counter and having an output bus;

c) a first divider, having a first input bus connected to said output bus of said single term counter, having a second input bus connected to said output bus of said total term counter, and having an output bus;

d) a first summing block, having an input bus connected to said output bus of said first divider, and having an output bus;

e) a bus counter, having an input bus connected to said first-input bus of said single term counter, and having an output;

f) a second divider, having a first input bus connected to said output bus of said first summing block, having a second input connected to said output of said bus counter, and having an output bus;

g) a second subtractor, having a first input bus connected to said output bus of said first divider, having a second input bus connected to said output bus of said second divider, and having an output bus;

h) a first squaring block, having an input bus connected to said output of said second subtractor, and having an output bus;

i) a first multiplier, having an input bus connected to said output of said second subtractor, and having an output bus;

j) a second summing block, having an input bus connected to said output of said first squaring block, and having an output bus;

k) a third summing block, having an input bus connected to said output bus of said first multiplier, and having an output bus;

l) a first square root block, having an input bus connected to said output bus of said second summing block, and having an output bus;

m) a second multiplier, having an input bus connected to said output bus of said first square root block, and having an output bus; and n) a third divider, having a first input bus connected to said output bus of said third summing block, having a second input bus connected to said output bus of said second multiplier, and having an output bus.

6. The device of claim 5 wherein said first function block, said second function block, and said third function block each further comprise:

a) an ordering block, having a first input bus connected to said output of said third divider, having a second input, and having an output bus b) a fourth summing block, having an input bus connected to said output bus of said ordering block, and having an output;

c) a maximizing block, having an input connected to said output of said fourth summing block, having a first output connected to said input of said ordering block, and having a second output; and d) a third subtractor, having a first input connected to said output of said bus counter, having a second input connected to said second output of said maximizing block, and having an output.

7. The device of claim 1 wherein said first input of said divider is connected to said output of said second function block.

8. The device of claim 7 wherein said first function block, said second function block, and said third function block each comprise:
   a) a single term counter, having a first input bus, a second input bus, and an output bus;
   b) a total term counter, having a first input bus connected to said first input bus of said single term counter, having a second input bus connected to said second input bus of said single term counter, and having an output bus;
   c) a bus counter, having an input bus connected to said first input bus of said single term counter, and having an output;
   d) a non-zero counter, having an input bus connected to said output bus of said single term counter, and having an output bus;
   e) a first divider, having a first input bus connected to said output bus of said term counter, having a second input bus connected to said output bus of said total term counter, and having an output bus;
   f) a second divider, having an input connected to said output of said bus counter, having an input bus connected to said output bus of said non-zero counter, and having an output bus;
   g) a natural log block, having an input bus connected to said output of said second divider, and having an output bus;
   h) a first squaring block, having an input bus connected to said output of said first divider, and having an output bus;
   i) a second squaring block, having an input bus connected to said output bus of said natural log block, and having an output bus;
   j) a first multiplier, having an input bus connected to said output bus of said first divider, and having an output bus;
   k) a second multiplier, having a first input bus connected to said output of said first squaring block, having a second input bus connected to said output of said second squaring block, and having an output bus;
   l) a first summing block, having an input bus connected to said output bus of said second multiplier block, and having an output bus;
   m) a first square root block, having an input bus connected to said output bus of said first summing block, and having an output bus;
   n) a third multiplier, having an input bus connected to said output bus of said first square root block, and having an output bus;
   o) a fourth multiplier, having a first input bus connected to said output bus of said second squaring block, having a second input bus connected to said output of said first multiplier, and having an output bus;
   p) a second summing block, having an input bus connected to said output bus of said fourth multiplier, and having an output bus; and
   q) a third divider, having a first input bus connected to said output bus of said third multiplier, having a second input bus connected to said output bus of said second summing block, and having an output.

9. The device of claim 8 wherein said first function block, said second function block, and said third function block each further comprise:
   a) an ordering block, having a first input bus connected to said output of said third divider, having a second input, and having an output bus
   b) a third summing block, having an input bus connected to said output bus of said ordering block, and having an output;
   c) a maximizing block, having an input connected to said output of said third summing block, having a first output connected to said input of said ordering block, and having a second output; and
   d) a second subtractor, having a first input connected to said output of said bus counter, having a second input connected to said second output of said maximizing block, and having an output.

10. The device of claim 7 wherein said first function block, said second function block, and said third function block each comprise:
    a) a single term counter, having a first input bus, a second input bus, and an output bus;
    b) a total term counter, having a first input bus connected to said first input bus of said single term counter, having a second input bus connected to said second input bus of said single term counter, and having an output bus;
    c) a first divider, having a first input bus connected to said output bus of said single term counter, having a second input bus connected to said output bus of said total term counter, and having an output bus;
    d) a first summing block, having an input bus connected to said output bus of said first divider, and having an output bus;
    e) a bus counter, having an input bus connected to said first input bus of said single term counter, and having an output;
    f) a second divider, having an input bus connected to said output bus of said first summing block, having an input connected to said output of said bus counter, and having an output bus;
    g) a second subtractor, having a first input bus connected to said output bus of said first divider, having a second input bus connected to said output bus of said second divider, and having an output bus;
    h) a first squaring block, having an input bus connected to said output of said second subtractor, and having an output bus;
    i) a first multiplier, having an input bus connected to said output of said second subtractor, and having an output bus
    j) a second summing block, having an input bus connected to said output of said first squaring block, and having an output bus;
    k) a third summing block, having an input bus connected to said output bus of said first multiplier, and having an output bus;
    l) a first square root block, having an input bus connected to said output bus of said second summing block, and having an output bus;
    m) a second multiplier, having an input bus connected to said output bus of said first square root block, and having an output bus; and
    n) a third divider, having a first input bus connected to said output bus of said third summing block, having a second input bus connected to said output bus of said second multiplier, and having an output bus.

11. The device of claim 10 wherein said first function block, said second function block, and said third function block each further comprise:

a) an ordering block, having a first input bus connected to said output of said third divider, having a second input, and having an output bus b) a fourth summing block, having an input bus connected to said output bus of said ordering block, and having an output;

c) a maximizing block, having an input connected to said output of said fourth summing block, having a first output connected to said input of said ordering block, and having a second output; and d) a third subtractor, having a first input connected to said output of said bus counter, having a second input connected to said second output of said maximizing block, and having an output.

12. A method of measuring similarity between a first set of items and a second set of items that does not require any apriori knowledges of the first set of items or the second set of items, comprising the steps of:

a) receiving the first set of items and the second set of items and performing a first user-definable function on the first set of items and the second set of items on a union block that performs a union function;

b) receiving a dictionary of terms and performing a first user-definable, non-linear function on the result of step (a) and the dictionary of terms on a first function block;

c) performing a second user-definable, non-linear function on the first set of items and the dictionary of terms on a second function block;

d) performing a third user-definable, non-linear function on the second set of items and the dictionary of terms on a third function block;

e) adding the results of step (c) and step (d) on an adder;

f) subtracting the results of step (a) from the results of step (e) on a subtractor; and g) dividing the result of step (f) by the result of step (b) on a divider and returning the result as the measure of similarity between the first set of items and the second set of items.

13. The method of claim 12, wherein the step of performing, on a computing device, a user-definable, non-linear mathematical operation based upon said dictionary of terms on the results of claim 12 step (b) comprises the steps of:

a) determining, on a computing device, a frequency of occurrence of each term in each item of said results of claim 12 step (b);

b) determining, on a computing device, a total number of terms in each item of said results of claim 12 step (b);

c) counting, on a computing device, a total number of items in said results of claim 12 step (b);

d) counting, on a computing device, a number of non-zero results of step (a);

e) dividing, on a computing device, the result of step (a) by the result of step (b) which correspond to the same item in said set;

f) dividing, on a computing device, the result of step (c) by the result of step (d);

g) computing, on a computing device, a natural log for each result of step (f);

h) multiplying, on a computing device, each combination of the results of step (e);

i) squaring, on a computing device, each result of step (e);

j) squaring, on a computing device, each result from step (g);

k) multiplying, on a computing device, each result of step (i) and the corresponding result of step (j);

l) summing, on a computing device, the results of step (k);

m) computing, on a computing device, a square root of each result of step (l);

n) multiplying, on a computing device, each combination of the results of step (m);

o) multiplying, on a computing device, the results of step (h) and the corresponding results of step (j);

p) summing, on a computing device, the results of step (o); and q) dividing, on a computing device, each result of step (n) by the corresponding result of step (p).

14. The method of claim 13, wherein the step of determining, on a computing device, information contained in said results from claim 12 step (b) further comprises the steps of:

r) determining, on a computing device, an ordering of the results of step (r) such that the sum of a user-definable subset of said results is maximized; and s) subtracting, on a computing device, each result of step (d) from each result of step (s).

15. The method of claim 12, wherein the step of performing, on a computing device, a user-definable, non-linear mathematical operation based upon said dictionary of terms on the results of claim 12 step (b) comprises the steps of:

a) determining, on a computing device, a frequency of occurrence of each term in each item of said results of claim 12 step (b);

b) determining, on a computing device, a total number of terms in each item of said results of claim 12 step (b);

c) counting, on a computing device, a total number of items of said results of claim 12 step (b);

d) dividing, on a computing device, each result of step (a) by the corresponding result of step (b);

e) summing, on a computing device, the results of step (d);

f) dividing, on a computing device, each result of step (e) by the corresponding result of step (c);

g) subtracting, on a computing device, each result of step (f) from the corresponding result of step (d);

h) squaring, on a computing device, each result from step (g);

i) summing, on a computing device, the results of step (h);

j) computing, on a computing device, a square root of each result of step (h);

k) multiplying, on a computing device, each combination of the results of step (j);

l) multiplying, on a computing device, each combination of the results of step (g);

m) summing, on a computing device, the results of step (l); and n) dividing, on a computing device, each combination of the results of step (m) by the results of step (k).

16. The method of claim 15, wherein the step of determining, on a computing device, information contained in said union of said first set and said second set further comprises the steps of:

o) determining, on a computing device, an ordering of the results from step (o) such that the sum of a user-definable subset of said results is maximized; and p) subtracting, on a computing device, the results from step (d) from the results from step (a).

17. The method of claim 12, wherein the step of performing, on a computing device, a user-definable, non-linear mathematical operation based upon said dictionary of terms on said first set of items comprises the steps of:

a) determining, on a computing device, a frequency of occurrence of each term in each item of said first set;

b) determining, on a computing device, a total number of terms in each item of said first set;

c) counting, on a computing device, the total number of items in said first set;

d) counting, on a computing device, the number of non-zero results of step (a);

e) dividing, on a computing device, the result of step (a) by the result of step (b) which correspond to the same item in said set;

f) dividing, on a computing device, the result of step (c) by the result of step (d);

g) computing, on a computing device, a natural log for each result of step (f);

h) multiplying, on a computing device, each combination of the results of step (e);

i) squaring, on a computing device, each result of step (e);

j) squaring, on a computing device, each result from step (g);

k) multiplying, on a computing device, each result of step (i) and the corresponding result of step (j);

l) summing, on a computing device, the results of step (k);

m) computing, on a computing device, the square root of each result of step (l);

n) multiplying, on a computing device, each combination of the results of step (m);

o) multiplying, on a computing device, the results of step (h) and the corresponding results of step (j);

p) summing, on a computing device, the results of step (o); and q) dividing, on a computing device, each result of step (p) by the corresponding result of step (n).

18. The method of claim 17, wherein the step of determining, on a computing device, the information contained in said first set further comprises the steps of:

r) determining, on a computing device, an ordering of the results of step (r) such that the sum of a user-definable subset of said results is maximized; and s) subtracting, on a computing device, each result of step (d) from each result of step (s).

19. The method of claim 12, wherein the step of performing, on a computing device, a user-definable, non-linear mathematical operation based upon said dictionary of terms on said first set of items comprises the steps of:

a) determining, on a computing device, a frequency of occurrence of each term in each item of said first set;

b) determining, on a computing device, a total number of terms in each item of said first set;

c) counting, on a computing device, a total number of items of said first set;

d) dividing, on a computing device, each result of step (a) by the corresponding result of step (b);

e) summing, on a computing device, the results of step (d);

f) dividing, on a computing device, each result of step (e) by the corresponding result of step (c);

g) subtracting, on a computing device, each result of step (f) from the corresponding result of step (d);

h) squaring, on a computing device, each result from step (g);

i) summing, on a computing device, the results of step (h);

j) computing, on a computing device, a square root of each result of step (h);

k) multiplying, on a computing device, each combination of the results of step (j);

l) multiplying, on a computing device, each combination of the results of step (g);

m) summing, on a computing device, the results of step (l); and n) dividing, on a computing device, each combination of the results of step (m) by the results of step (k).

20. The method of claim 19, wherein the step of determining, on a computing device, the information contained in said first set further comprises the steps of:

o) determining, on a computing device, an ordering of the results from step (o) such that the sum of a user-definable subset of said results is maximized; and p) subtracting, on a computing device, the results from step (d) from the results from step (a).

21. The method of claim 12, wherein the step of performing, on a computing device, a user-definable, non-linear mathematical operation based upon said dictionary of terms on said second set of items comprises the steps of:

a) determining, on a computing device, a frequency of occurrence of each term in each item of said second set;

b) determining, on a computing device, a total number of terms in each item of said second set;

c) counting, on a computing device, the total number of items in said second set;

d) counting, on a computing device, the number of non-zero results of step (a);

e) dividing, on a computing device, the result of step (a) by the result of step (b) which correspond to the same item in said set;

f) dividing, on a computing device, the result of step (c) by the result of step (d);

g) computing, on a computing device, a natural log for each result of step (f);

h) multiplying, on a computing device, each combination of the results of step (e);

i) squaring, on a computing device, each result of step (e);

j) squaring, on a computing device, each result from step (g);

k) multiplying, on a computing device, each result of step (i) and the corresponding result of step (j);

l) summing, on a computing device, the results of step (k);

m) computing, on a computing device, the square root of each result of step (l);

n) multiplying, on a computing device, each combination of the results of step (m);

o) multiplying, on a computing device, the results of step (h) and the corresponding results of step (j);

p) summing, on a computing device, the results of step (o); and q) dividing, on a computing device, each result of step (p) by the corresponding result of step (n).

22. The method of claim 21, wherein the step of determining, on a computing device, the information contained in said second set further comprises the steps of:

r) determining, on a computing device, an ordering of the results of step (r) such that the sum of a user-definable subset of said results is maximized; and s) subtracting, on a computing device, each result of step (d) from each result of step (s).

23. The method of claim 12, wherein the step of performing, on a computing device, a user-definable, non-linear mathematical operation based upon said dictionary of terms on said second set of items comprises the steps of:

a) determining, on a computing device, a frequency of occurrence of each term in each item of said second set;

b) determining, on a computing device, a total number of terms in each item of said second set;

c) counting, on a computing device, a total number of items of said second set;

d) dividing, on a computing device, each result of step (a) by the corresponding result of step (b);

e) summing, on a computing device, the results of step (d);

f) dividing, on a computing device, each result of step (e) by the corresponding result of step (c);

g) subtracting, on a computing device, each result of step (f) from the corresponding result of step (d);

h) squaring, on a computing device, each result from step (g);

i) summing, on a computing device, the results of step (h);

j) computing, on a computing device, a square root of each result of step (h);

k) multiplying, on a computing device, each combination of the results of step (j);

l) multiplying, on a computing device, each combination of the results of step (g);

m) summing, on a computing device, the results of step (l); and n) dividing, on a computing device, each combination of the results of step (m) by the results of step (k).

24. The method of claim 23, wherein the step of determining, on a computing device, the information contained in said second set further comprises the steps of:
  o) determining, on a computing device, an ordering of the results from step (o) such that the sum of a user-definable subset of said results is maximized; and
  p) subtracting, on a computing device, the results from step (d) from the results from step (a).

25. The method of claim 12, wherein said first set of items and said second set of items are selected from the group of sets consisting of:
  a) documents attributed to a same author;
  b) queries, made to a database or computer search tools, attributed to the same user;
  c) genes in genome-wide association studies;
  d) reports which cite a same source;
  e) reports which pertain to a same topic;
  f) communications metadata possessing a same metadata subfield;
  g) data elements for friends of a same individual;
  h) data elements for individuals within a same social group;
  i) data elements for individuals who purchase a same commodity;
  j) data elements for commodities purchased by a same individual;
  k) data elements for genes from an individual;
  l) data elements for people from a same family; and
  m) data elements for genes from individuals with a same disease.

* * * * *